(12) United States Patent  (10) Patent No.: US 9,193,357 B2
Jeon et al.  (45) Date of Patent: Nov. 24, 2015

(54) SYSTEM AND METHOD OF DETERMINING LONG TERM DRIVING TENDENCY OF DRIVER

(71) Applicants: Hyundai Motor Company, Seoul (KR); Kia Motors Corporation, Seoul (KR)

(72) Inventors: Byeong Wook Jeon, Seoul (KR); Joseph D Chang, Yongin-si (KR); Dong Hoon Jeong, Osan-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 75 days.

(21) Appl. No.: 14/098,530

(22) Filed: Dec. 6, 2013

(65) Prior Publication Data

US 2014/0277972 A1  Sep. 18, 2014

(30) Foreign Application Priority Data

Mar. 18, 2013  (KR) .................... 10-2013-0028854

(51) Int. Cl.
*B60W 40/09* (2012.01)
*B60W 40/06* (2012.01)
(Continued)

(52) U.S. Cl.
CPC ........... *B60W 30/1882* (2013.01); *B60W 30/19* (2013.01); *B60W 40/04* (2013.01); *B60W 40/06* (2013.01); *B60W 40/09* (2013.01); *B60W 50/10* (2013.01); *F16H 61/0213* (2013.01); *G06Q 30/00* (2013.01); *G07C 5/0841* (2013.01); *B60W 10/06* (2013.01); *B60W 10/10* (2013.01); *B60W 2050/0051* (2013.01); *B60W 2050/0088* (2013.01); *B60W 2050/0089* (2013.01); *B60W 2550/141* (2013.01); *B60W 2550/143* (2013.01); *B60W 2550/146* (2013.01); *B60W 2550/20* (2013.01); *B60W 2550/402* (2013.01); *F02D 2200/606* (2013.01); *G06Q 10/06* (2013.01); *G06Q 30/012* (2013.01); *G07C 5/085* (2013.01)

(58) Field of Classification Search
CPC ...... B60W 40/09; B60W 40/04; B60W 40/06
USPC .................................................. 701/51, 1
See application file for complete search history.

(56) References Cited

U.S. PATENT DOCUMENTS

| 5,152,192 A | 10/1992 | Koenig et al. | |
|---|---|---|---|
| 2011/0118929 A1* | 5/2011 | Takae et al. | 701/29 |
| 2013/0110349 A1* | 5/2013 | Tseng et al. | 701/36 |

FOREIGN PATENT DOCUMENTS

| JP | 3446438 B2 | 7/2003 |
|---|---|---|
| KR | 10-0295851 B1 | 5/2001 |

(Continued)

*Primary Examiner* — Nga X Nguyen
(74) *Attorney, Agent, or Firm* — Morgan, Lewis & Bockius LLP (57) ABSTRACT

A system and a method of determining a long term driving tendency of a driver may include a data detector detecting data for determining the long term driving tendency and a short term driving tendency of the driver; and a controller determining the short term driving tendency and the long term driving tendency of the driver based on the data received from the data detector, and controlling an engine or a transmission according to the short term driving tendency of the driver or the long term driving tendency of the driver, wherein the controller continuously determines the short term driving tendency of the driver for a predetermined time and determines the long term driving tendency of the driver from a predetermined number (n) of short term driving tendencies of the driver.

8 Claims, 5 Drawing Sheets

(51) Int. Cl.
  *B60W 40/02* (2006.01)
  *B60W 30/188* (2012.01)
  *G07C 5/08* (2006.01)
  *G06Q 30/00* (2012.01)
  *B60W 50/10* (2012.01)
  *B60W 30/19* (2012.01)
  *B60W 40/04* (2006.01)
  *F16H 61/02* (2006.01)
  *G06Q 10/06* (2012.01)
  *B60W 10/06* (2006.01)
  *B60W 10/10* (2012.01)
  *B60W 50/00* (2006.01)

(56) References Cited

FOREIGN PATENT DOCUMENTS

KR        10-0391724 B1      7/2003
KR     10-2012-0132993 A    12/2012

* cited by examiner

SYSTEM AND METHOD OF DETERMINING LONG TERM DRIVING TENDENCY OF DRIVER

CROSS-REFERENCE TO RELATED APPLICATION

The present application claims priority to Korean Patent Application No. 10-2013-0028854 filed on Mar. 18, 2013, the entire contents of which is incorporated herein for all purposes by this reference.

BACKGROUND OF THE INVENTION

1. Field of the Invention

The present invention relates to a system and a method of determining a long term driving tendency of a driver. More particularly, the present invention relates to a system and a method of determining a long term driving tendency of a driver from a predetermined number of short term driving tendencies of the driver.

2. Description of Related Art

Customer satisfaction related to driving performance of a vehicle depends on how precisely the vehicle runs in accordance with a tendency of the customer. While tendencies of the customers vary, however, performance characteristic of the vehicle is set to one performance characteristic in the same vehicle model. Therefore, reaction of the vehicle may not coincide with the tendency of the customer. Accordingly, the customer often lodges a complaint against the driving performance of the vehicle. That is, if the driving tendency of the customer is grasped and a shift of the vehicle is controlled to coincide with the tendency of the customer, the customer satisfaction related to the driving performance may be maximized.

Therefore, many methods of learning the driving tendency of the customer for a long time and controlling the shift according to the learned driving tendency have been developed. The method of controlling the shift according to the learned driving tendency is performed under the assumption that the driving tendency of the customer is constant. The driving tendency of the driver, however, is not constant and changes according to temporary changes of driver's feeling or driving will, road condition and so on. Therefore, the learned driving tendency may differ greatly from an actual driving tendency of the driver at one point.

In addition, the driving tendency of the driver may change with the passage of time. According to a conventional method of learning the driving tendency, however, change of the driving tendency with the passage of time is slowly reflected.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a system and a method of determining a long term driving tendency of a driver having advantages of performing a customized shift by precisely determining the long term driving tendency of the driver.

A system of determining a long term driving tendency of a driver according to an exemplary embodiment of the present invention may include a data detector detecting data for determining the long term driving tendency and a short term driving tendency of the driver, and a controller determining the short term driving tendency and the long term driving tendency of the driver based on the data received from the data detector, and controlling an engine or a transmission according to the short term driving tendency of the driver or the long term driving tendency of the driver, wherein the controller continuously determines the short term driving tendency of the driver for a predetermined time and determines the long term driving tendency of the driver from a predetermined number (n) of short term driving tendencies of the driver.

The controller determines the long term driving tendency of the driver from latest n short term driving tendencies of the driver.

The controller determines the long term driving tendency of the driver (SI_long) from an equation $$SI\_long = \frac{\sum_{i=1}^{n} SI\_Avg_{n-i+1} \times W_i}{nT_1},$$

wherein SI_Avg, represents i-th short term driving tendency of the driver, $T_1$ represents the predetermined time, and $W_i$ represents i-th weight value.

Weight values satisfy relation of $W_i \leq W_{i+1}$.

Sum of n weight values is 1.

The controller does not determine the short term driving tendency of the driver when the data shows a road condition is a specific road state, a specific road shape or a congested road.

In another aspect of the present invention, a method of determining a long term driving tendency of a driver, comprising detecting data for determining the long term driving tendency and a short term driving tendency of the driver, determining a short term driving tendency index for a predetermined time, determining a long term driving tendency index from latest n short term driving tendency indexes, and controlling a shift according to the long term driving tendency index.

The long term driving tendency index (SI_long) is determined from an equation $$SI\_long = \frac{\sum_{i=1}^{n} SI\_Avg_{n-i+1} \times W_i}{nT_1},$$

wherein SI_Avg, represents i-th short term driving tendency index, $T_1$ represents the predetermined time, and $W_i$ represents i-th weight value.

Weight values satisfy relation of $W_i \leq W_{i+1}$.

Sum of n weight values is 1.

The short term driving tendency index is not determined when the data shows a road condition is a specific road state, a specific road shape or a congested road.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

Figure 1:
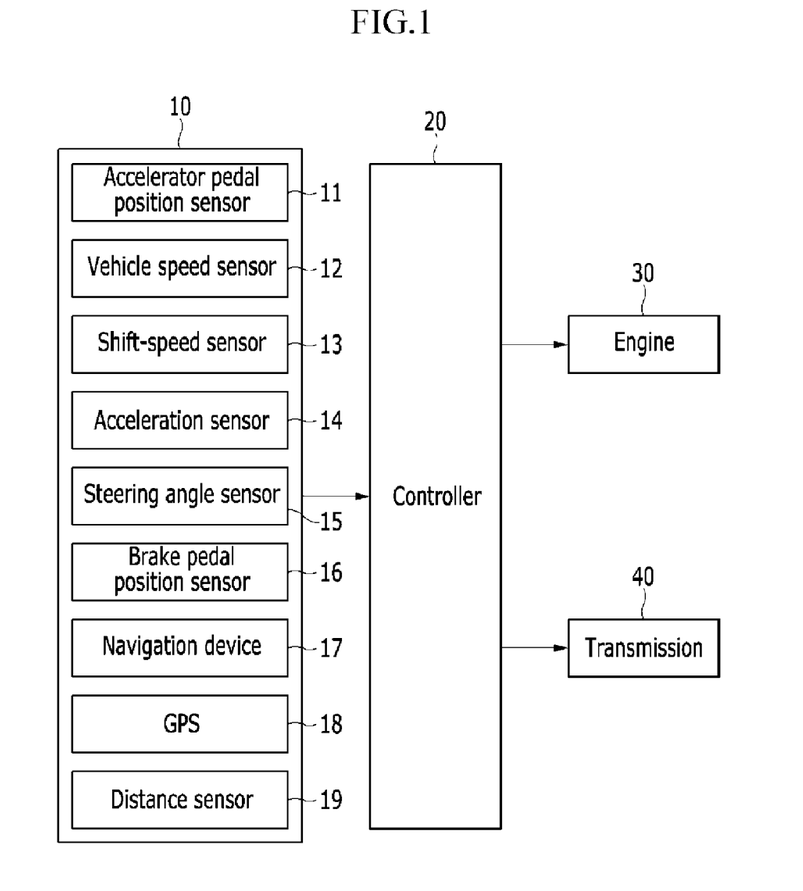
FIG. 1 is a block diagram of a system of determining a long term driving tendency of a driver according to an exemplary embodiment of the present invention.
Figure 2:
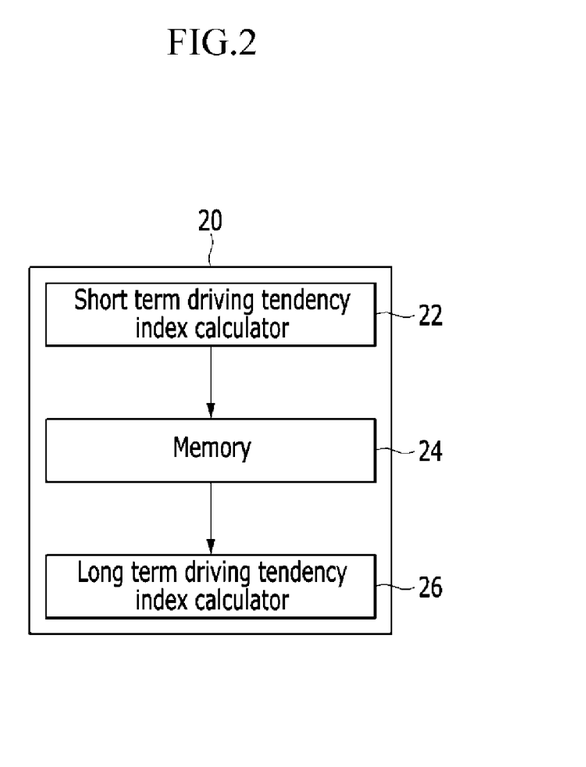
FIG. 2 is a block diagram of a controller provided in a system of determining a long term driving tendency of a driver according to an exemplary embodiment of the present invention.
Figure 3:
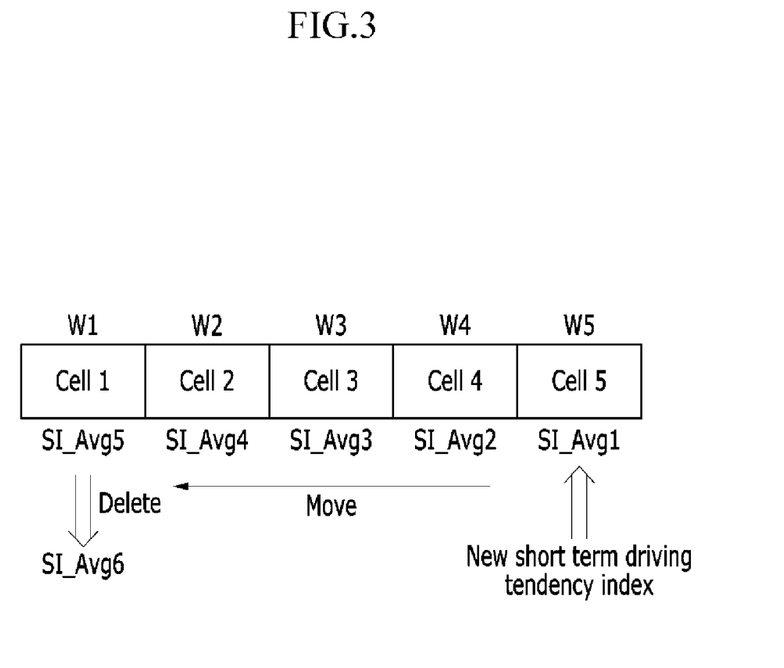
FIG. 3 is a schematic diagram illustrating a data structure of a memory in FIG. 2.

FIG. 1 is a block diagram of a system of determining a long term driving tendency of a driver according to an exemplary embodiment of the present invention, FIG. 2 is a block diagram of a controller provided in a system of determining a long term driving tendency of a driver according to an exemplary embodiment of the present invention, and FIG. 3 is a schematic diagram illustrating a data structure of a memory in FIG. 2.

As shown in FIG. 1, a system of determining a long term driving tendency of a driver according to an exemplary embodiment of the present invention includes a data detector 10, a controller 20, an engine 30 and a transmission 40.

The data detector 10 detects data for determining the long term driving tendency and a short term driving tendency of the driver, and the data detected by the data detector 10 is transmitted to the controller 20. The data detector 10 includes an accelerator pedal position sensor 11, a vehicle speed sensor 12, a shift-speed sensor 13, an acceleration sensor 14, a steering angle sensor 15, a brake pedal position sensor 16, a navigation device 17, a global positioning system (GPS) 18 and a distance sensor 19.

The accelerator pedal position sensor 11 detects a degree with which a driver pushes an accelerator pedal. That is, the accelerator pedal position sensor 11 detects the data related to driver's acceleration will.

The vehicle speed sensor 12 detects a vehicle speed, and is mounted at a wheel of the vehicle. On the contrary, the vehicle speed may be calculated based on a GPS signal received by the GPS 18.

Meanwhile, a target shift-speed may be calculated by using a shift pattern based on the signal of the accelerator pedal position sensor 11 and the signal of the vehicle speed sensor 12, and the shift to the target shift-speed is controlled. That is, hydraulic pressure supplied to a plurality of friction elements or released from the plurality of friction elements is controlled in an automatic transmission provided with a plurality of planetary gear sets and the plurality of friction elements. In addition, current applied to a plurality of synchronizer devices and actuators is controlled in a double clutch transmission.

The shift-speed sensor 13 detects a shift-speed that is currently engaged.

The acceleration sensor 14 detects an acceleration of the vehicle. The acceleration sensor 14 may be mounted in addition to the vehicle speed sensor 12 and may directly detects the acceleration of the vehicle, or the acceleration sensor 14 may calculates the acceleration of the vehicle by differentiating the vehicle speed detected by the vehicle speed sensor 12.

The steering angle sensor 15 detects a steering angle of the vehicle. That is, the steering angle sensor 15 detects a direction to which the vehicle runs.

The brake pedal position sensor 16 detects whether a brake pedal is pushed or not. That is, the brake pedal position sensor 16 as well as the accelerator pedal position sensor 11 detects the driver's acceleration will.

The navigation device 17 is a device which informs the driver of a route to a destination. The navigation device 17 includes an input/output portion inputting or outputting information for guidance of the route, a current position detecting portion detecting information on a current position of the vehicle, a memory in which a map data for calculating the route and a data for guiding the route are stored, and a control portion for searching the route and performing guidance of the route.

The GPS 18 receives a signal transmitted from a GPS satellite and transmits a signal corresponding thereto to the navigation device 17.

The distance sensor 19 detects a distance between the vehicle of the driver and a preceding vehicle. Various sensors such as an ultrasonic wave sensor and an infrared sensor may be used as the distance sensor 19.

The controller 20 determines the short term driving tendency and the long term driving tendency of the driver based on the data detected by the data detector 10. For these purposes, the controller 20 can be realized by one or more processors activated by a predetermined program, and the predetermined program can be programmed to perform each step of a method of determining the long term driving tendency of the driver according to an exemplary embodiment of the present invention.

The controller 20, as shown in FIG. 2, includes a short term driving tendency index calculator 22, a memory 24 and a long term driving tendency index calculator 26.

The short term driving tendency index calculator 22 determines the short term driving tendency of the driver for a comparatively short time based on the data detected by the data detector 10. That is, the short term driving tendency index calculator 22 determines the driving tendency of the driver, for example, during a current driving or for a predetermined time in the current driving. The short term driving tendency of the driver may be determined based on how well one or more assumptions related to the driving tendency of the driver are satisfied, and fuzzy control theory may be used to determine the short term driving tendency of the driver. The short term driving tendency of the driver determined by the short term driving tendency index calculator 22 is calculated as a short term driving tendency index, and the short term driving tendency index is transmitted to and is stored in the memory 24.

The memory 24 stores the short term driving tendency index calculated by the short term driving tendency index calculator 22. As shown in FIG. 3, the memory 24 is provided with n cells, and the short term driving tendency index and a weight value are stored in each cell. That is, an (n−i+1)-th short term driving tendency index $SI\_Avg_{n-i+1}$ and i-th weight value $W_i$ are stored in an i-th cell. If a new short term driving tendency index $SI\_Avg_i$ is calculated, and i-th short term driving tendency index is newly stored as an (i+1)-th short term driving tendency index and a previous n-th short term driving tendency index $SI\_Avg_n$ is deleted. That is, only the latest n short term driving tendency indexes are always stored in the memory 24.

In addition, the weight values are set according to design scheme of a designer. The weight values may be tuned, but are maintained for a long time once the weight values are stored. Sum of the n weight values is 1, and an i-th weight value is smaller than or equal to an (i+1)-th weight value. The latest short term driving tendency index exercises greatest influence over the long term driving tendency index by setting the (i+1)-th weight value to be larger than or equal to the i-th weight value.

It is exemplified in this specification, but is not limited, that five cells are provided in the memory 24.

The long term driving tendency index calculator 26 determines the long term driving tendency of the driver from the n short term driving tendency index stored in the memory 24. The long term driving tendency of the driver determined by the long term driving tendency index calculator 26 is calculated as a long term driving tendency index.

Meanwhile, the controller 20 can determine a condition of a road on which the vehicle runs currently based on the data detected by the data detector 10. The road condition includes a specific road state such as an icy road, a slippery road, a rough road and an unpaved road, a specific road shape such as a curve road and an inclined road, and a congested degree. If the road condition shows the specific road state, the specific road shape or the congested road, it is general that the vehicle runs not according to the driving tendency of the driver but according to the road condition. Therefore, the driving tendency of the driver can be precisely calculated by not calculating the short term driving tendency of the driver under the specific road condition.

On the contrary, the short term driving tendency of the driver may be calculated under the specific road condition. In this case, a strong filter is applied to the short term driving tendency of the driver calculated under the specific road condition.

In addition, the controller 20 controls an engine 30 or a transmission 40 according to the long term driving tendency index. That is, the controller 20 may change a shift pattern, engaging feeling to the target shift-speed, an engine torque map and/or an engine torque filter according to the long term driving tendency index.

Hereinafter, referring to FIG. 4 and FIG. 5, the method of determining the long term driving tendency of the driver will be described in detail.

Figure 4:
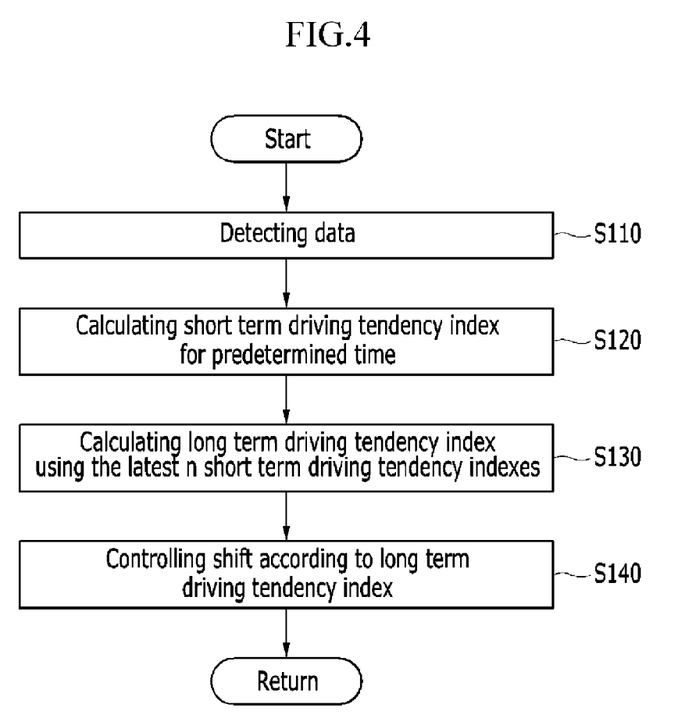
FIG. 4 is a flowchart of a method of determining a long term driving tendency of a driver according to an exemplary embodiment of the present invention.
Figure 5:
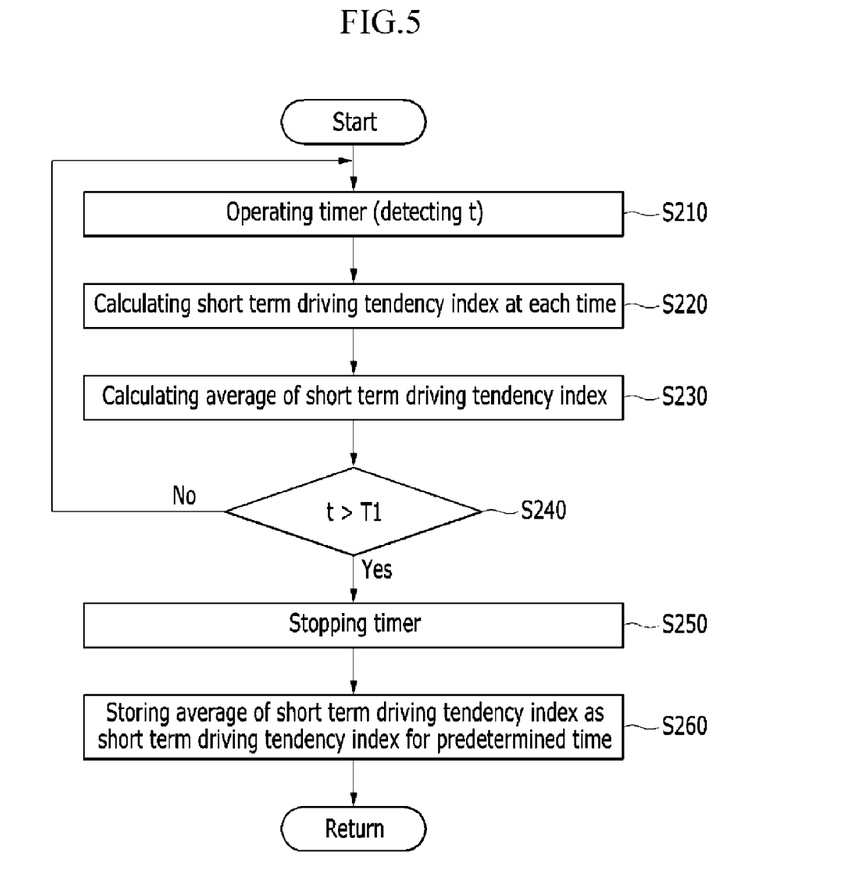
FIG. 5 is a flowchart of a method of calculating a short term driving tendency index for a predetermined time in a method of determining a long term driving tendency of a driver according to an exemplary embodiment of the present invention.

FIG. 4 is a flowchart of a method of determining a long term driving tendency of a driver according to an exemplary embodiment of the present invention, and FIG. 5 is a flowchart of a method of calculating a short term driving tendency index for a predetermined time in a method of determining a long term driving tendency of a driver according to an exemplary embodiment of the present invention.

As shown in FIG. 4, the method of determining the long term driving tendency of the driver according to the exemplary embodiment of the present invention begins with detecting the data at step S110.

If the data detector 10 detects the data and transmits the data to the controller 20, the controller 20 calculates the short term driving tendency index for a predetermined time $T_1$ at step S120.

That is, as shown in FIG. 5, the controller 20 operates a timer and detects an elapsed time t at step S210.

After that, the controller 20 calculates the short term driving tendency index SI at each time at step S220 and calculates an average of the short term driving tendency index at each time at step S230.

After that, the controller 20 determines whether the elapsed time t is greater than the predetermined time $T_1$ at step S240. If the elapsed time t is not greater than the predetermined time $T_1$, the controller 20 returns to the step S210. If the elapsed time t is greater than the predetermined time $T_1$, the controller 20 stops the timer at step S250 and stores the average of the short term driving tendency index as the short term driving tendency index SI_Avg for the predetermined time at step S260. That is, the short term driving tendency index SI_Avg for the predetermined time is calculated from the following equation.

$$SI\_Avg = \frac{\sum_{t=t_0}^{t_0+T_1(sec)} SI}{T_1(sec)}$$

If the short term driving tendency index for the predetermined time is calculated at the step S120, the controller 20 calculates the long term driving tendency index SI_long using the latest n short term driving tendency indexes from the following equation at step S130.

$$SI\_long = \frac{\sum_{i=1}^{n} SI\_Avg_{n-i+1} \times W_i}{nT_1}$$

If the long term driving tendency index is calculated at the step S130, the controller 20 controls a shift according to the long term driving tendency index at step S140. That is, the controller 20 changes an engine torque map and an engine torque filter according to the long term driving tendency index, and controls the engine 30 according to the changed engine torque map and the changed engine torque filter. In addition, the controller 20 changes a shift pattern and engaging feeling to the target shift-speed according to the long term driving tendency index, and controls the transmission 40 according to the changed shift pattern and the changed engaging feeling to the target shift-speed.

As described above, since the long term driving tendency of the driver is calculated from a predetermined number of the short term driving tendencies of the driver, it is easy to calculate the long term driving tendency of the driver according to the exemplary embodiments of the present invention.

In addition, since the largest weight value is given to the latest short term driving tendency of the driver, the long term driving tendency of the driver is precisely calculated.

Further, since the long term driving tendency of the driver is precisely determined, a customized shift may be provided.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A system of determining a long term driving tendency of a driver, comprising:
    a data detector detecting data for determining the long term driving tendency and a short term driving tendency of the driver; and
    a controller determining the short term driving tendency and the long term driving tendency of the driver based on the data received from the data detector, and controlling an engine or a transmission according to the short term driving tendency of the driver or the long term driving tendency of the driver,
    wherein the controller continuously determines the short term driving tendency of the driver for a predetermined time and determines the long term driving tendency of the driver from a predetermined number (n) of short term driving tendencies of the driver,
    wherein the controller determines the long term driving tendency of the driver from latest n short term driving tendencies of the driver,
    wherein the controller determines the long term driving tendency of the driver ($SI_{13}$ long) from an equation $$SI\_long = \frac{\sum_{i=1}^{n} SI\_Avg_{n-i+1} \times W_i}{nT_1},$$

wherein $SI\_Avg_i$ represents an i-th short term driving tendency of the driver, $T_1$ represents the predetermined time, and Wi represents a preset i-th weight value.

2. The system of claim 1, wherein the weight values satisfy a relation of $W_i \leq W_{i+1}$.

3. The system of claim 1, wherein a sum of the n weight values is 1.

4. The system of claim 1, wherein the controller does not determine the short term driving tendency of the driver when the data shows a road condition is a specific road state, a specific road shape or a congested road.

5. A method of determining a long term driving tendency of a driver, comprising:
    detecting data for determining the long term driving tendency and a short term driving tendency of the driver;
    determining a short term driving tendency index for a predetermined time based on the detected data;
    determining a long term driving tendency index from latest n short term driving tendency indexes; and
    controlling a shift according to the long term driving tendency index, wherein the shift includes changing at least one of an engine torque map and an engine torque filter,
    wherein the long term driving tendency index (SI_long) is determined from an equation $$SI\_long = \frac{\sum_{i=1}^{n} SI\_Avg_{n-i+1} \times W_i}{nT_1},$$

wherein $SI\_Avg_i$ represents an i-th short term driving tendency index, $T_1$ represents the predetermined time, and Wi represents a preset i-th weight value.

6. The method of claim 5, wherein weight values satisfy relation of $W_i \leq W_{i+1}$.

7. The method of claim 5, wherein sum of n weight values is 1.

8. The method of claim 5, wherein the short term driving tendency index is not determined when the data shows a road condition is a specific road state, a specific road shape or a congested road.

* * * * *